United States Patent
Flaks et al.

(10) Patent No.: US 9,123,316 B2
(45) Date of Patent: Sep. 1, 2015

(54) INTERACTIVE CONTENT CREATION

(75) Inventors: Jason Flaks, Redmond, WA (US); Rudy Jacobus Poot, Clyde Hill, WA (US); Alex Aben-Athar Kipman, Redmond, WA (US); Chris Miles, Seattle, WA (US); Andrew John Fuller, Redmond, WA (US); Jeffrey Neil Margolis, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 462 days.

(21) Appl. No.: 12/978,799

(22) Filed: Dec. 27, 2010

(65) Prior Publication Data

US 2012/0165964 A1 Jun. 28, 2012

(51) Int. Cl.
G06F 17/00 (2006.01)
G10H 1/00 (2006.01)
G06F 3/01 (2006.01)

(52) U.S. Cl.
CPC .............. G10H 1/0008 (2013.01); G06F 3/011 (2013.01); G06F 3/017 (2013.01); *G10H 2220/201* (2013.01); *G10H 2220/455* (2013.01)

(58) Field of Classification Search
CPC ..... G06F 3/0425; G06F 3/0248; G06F 3/017; G06F 3/011
USPC .................................... 700/94; 381/104–107
See application file for complete search history.

(56) References Cited

U.S. PATENT DOCUMENTS

| | | |
|---|---|---|
| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |

(Continued)

FOREIGN PATENT DOCUMENTS

| | | |
|---|---|---|
| CN | 1231753 | 10/1999 |
| CN | 1969589 | 5/2007 |

(Continued)

OTHER PUBLICATIONS

"A Letter from Marc Whitten: Xbox LIVE @ E3 2009," Jun. 1, 2009, pp. 1-2. Retrieved from the Internet on Aug. 25, 2010: URL: <http://blogs.msdn.com/b/xboxvoices/archive/2009/06/01/a-letter-from-marc-whitten-xbox-live-e3-2009.aspx>.

(Continued)

*Primary Examiner* — Lun-See Lao
(74) *Attorney, Agent, or Firm* — Dan Choi; Judy Yee; Micky Minhas

(57) ABSTRACT

An audio/visual system (e.g., such as an entertainment console or other computing device) plays a base audio track, such as a portion of a pre-recorded song or notes from one or more instruments. Using a depth camera or other sensor, the system automatically detects that a user (or a portion of the user) enters a first collision volume of a plurality of collision volumes. Each collision volume of the plurality of collision volumes is associated with a different audio stem. In one example, an audio stem is a sound from a subset of instruments playing a song, a portion of a vocal track for a song, or notes from one or more instruments. In response to automatically detecting that the user (or a portion of the user) entered the first collision volume, the appropriate audio stem associated with the first collision volume is added to the base audio track or removed from the base audio track.

16 Claims, 10 Drawing Sheets

(56) References Cited

U.S. PATENT DOCUMENTS

| | | | |
|---|---|---|---|
| 4,711,543 A | 12/1987 | Blair et al. | |
| 4,751,642 A | 6/1988 | Silva et al. | |
| 4,796,997 A | 1/1989 | Svetkoff et al. | |
| 4,809,065 A | 2/1989 | Harris et al. | |
| 4,817,950 A | 4/1989 | Goo | |
| 4,843,568 A | 6/1989 | Krueger et al. | |
| 4,893,183 A | 1/1990 | Nayar | |
| 4,901,362 A | 2/1990 | Terzian | |
| 4,925,189 A | 5/1990 | Braeunig | |
| 4,973,837 A * | 11/1990 | Bradbeer | 250/221 |
| 5,101,444 A | 3/1992 | Wilson et al. | |
| 5,148,154 A | 9/1992 | MacKay et al. | |
| 5,184,295 A | 2/1993 | Mann | |
| 5,191,319 A * | 3/1993 | Kiltz | 345/73 |
| 5,229,754 A | 7/1993 | Aoki et al. | |
| 5,229,756 A | 7/1993 | Kosugi et al. | |
| 5,239,463 A | 8/1993 | Blair et al. | |
| 5,239,464 A | 8/1993 | Blair et al. | |
| 5,288,078 A * | 2/1994 | Capper et al. | 463/39 |
| 5,295,491 A | 3/1994 | Gevins | |
| 5,320,538 A | 6/1994 | Baum | |
| 5,347,306 A | 9/1994 | Nitta | |
| 5,385,519 A | 1/1995 | Hsu et al. | |
| 5,405,152 A | 4/1995 | Katanics et al. | |
| 5,417,210 A | 5/1995 | Funda et al. | |
| 5,423,554 A | 6/1995 | Davis | |
| 5,454,043 A | 9/1995 | Freeman | |
| 5,469,740 A | 11/1995 | French et al. | |
| 5,495,576 A | 2/1996 | Ritchey | |
| 5,516,105 A | 5/1996 | Eisenbrey et al. | |
| 5,524,637 A | 6/1996 | Erickson et al. | |
| 5,534,917 A | 7/1996 | MacDougall | |
| 5,563,988 A | 10/1996 | Maes et al. | |
| 5,577,981 A | 11/1996 | Jarvik | |
| 5,580,249 A | 12/1996 | Jacobsen et al. | |
| 5,594,469 A | 1/1997 | Freeman et al. | |
| 5,597,309 A | 1/1997 | Riess | |
| 5,616,078 A | 4/1997 | Oh | |
| 5,617,312 A | 4/1997 | Iura et al. | |
| 5,638,300 A | 6/1997 | Johnson | |
| 5,641,288 A | 6/1997 | Zaenglein | |
| 5,682,196 A * | 10/1997 | Freeman | 725/139 |
| 5,682,229 A | 10/1997 | Wangler | |
| 5,690,582 A | 11/1997 | Ulrich et al. | |
| 5,703,367 A | 12/1997 | Hashimoto et al. | |
| 5,704,837 A | 1/1998 | Iwasaki et al. | |
| 5,715,834 A | 2/1998 | Bergamasco et al. | |
| 5,875,108 A | 2/1999 | Hoffberg et al. | |
| 5,877,803 A | 3/1999 | Wee et al. | |
| 5,913,727 A | 6/1999 | Ahdoot | |
| 5,933,125 A | 8/1999 | Fernie | |
| 5,980,256 A | 11/1999 | Carmein | |
| 5,989,157 A | 11/1999 | Walton | |
| 5,995,649 A | 11/1999 | Marugame | |
| 6,005,548 A * | 12/1999 | Latypov et al. | 345/156 |
| 6,009,210 A | 12/1999 | Kang | |
| 6,054,991 A | 4/2000 | Crane et al. | |
| 6,066,075 A | 5/2000 | Poulton | |
| 6,072,494 A | 6/2000 | Nguyen | |
| 6,073,489 A | 6/2000 | French et al. | |
| 6,077,201 A | 6/2000 | Cheng et al. | |
| 6,098,458 A | 8/2000 | French et al. | |
| 6,100,896 A | 8/2000 | Strohecker et al. | |
| 6,101,289 A | 8/2000 | Kellner | |
| 6,128,003 A | 10/2000 | Smith et al. | |
| 6,130,677 A | 10/2000 | Kunz | |
| 6,141,463 A | 10/2000 | Covell et al. | |
| 6,147,678 A | 11/2000 | Kumar et al. | |
| 6,152,856 A | 11/2000 | Studor et al. | |
| 6,159,100 A | 12/2000 | Smith | |
| 6,173,066 B1 | 1/2001 | Peurach et al. | |
| 6,181,343 B1 | 1/2001 | Lyons | |
| 6,188,777 B1 | 2/2001 | Darrell et al. | |
| 6,215,890 B1 | 4/2001 | Matsuo et al. | |
| 6,215,898 B1 | 4/2001 | Woodfill et al. | |
| 6,226,396 B1 | 5/2001 | Marugame | |
| 6,229,913 B1 | 5/2001 | Nayar et al. | |
| 6,256,033 B1 | 7/2001 | Nguyen | |
| 6,256,400 B1 | 7/2001 | Takata et al. | |
| 6,283,860 B1 | 9/2001 | Lyons et al. | |
| 6,289,112 B1 | 9/2001 | Jain et al. | |
| 6,299,308 B1 | 10/2001 | Voronka et al. | |
| 6,308,565 B1 | 10/2001 | French et al. | |
| 6,316,934 B1 | 11/2001 | Amorai-Moriya et al. | |
| 6,363,160 B1 | 3/2002 | Bradski et al. | |
| 6,384,819 B1 | 5/2002 | Hunter | |
| 6,411,744 B1 | 6/2002 | Edwards | |
| 6,430,997 B1 | 8/2002 | French et al. | |
| 6,476,834 B1 | 11/2002 | Doval et al. | |
| 6,496,598 B1 | 12/2002 | Harman | |
| 6,503,195 B1 | 1/2003 | Keller et al. | |
| 6,539,931 B2 | 4/2003 | Trajkovic et al. | |
| 6,570,555 B1 | 5/2003 | Prevost et al. | |
| 6,633,294 B1 | 10/2003 | Rosenthal et al. | |
| 6,640,202 B1 | 10/2003 | Dietz et al. | |
| 6,661,918 B1 | 12/2003 | Gordon et al. | |
| 6,681,031 B2 | 1/2004 | Cohen et al. | |
| 6,714,665 B1 | 3/2004 | Hanna et al. | |
| 6,731,799 B1 | 5/2004 | Sun et al. | |
| 6,738,066 B1 | 5/2004 | Nguyen | |
| 6,765,726 B2 | 7/2004 | French et al. | |
| 6,788,809 B1 | 9/2004 | Grzeszczuk et al. | |
| 6,801,637 B2 | 10/2004 | Voronka et al. | |
| 6,873,723 B1 | 3/2005 | Aucsmith et al. | |
| 6,876,496 B2 | 4/2005 | French et al. | |
| 6,937,742 B2 | 8/2005 | Roberts et al. | |
| 6,950,534 B2 | 9/2005 | Cohen et al. | |
| 7,003,134 B1 | 2/2006 | Covell et al. | |
| 7,036,094 B1 | 4/2006 | Cohen et al. | |
| 7,038,855 B2 | 5/2006 | French et al. | |
| 7,039,676 B1 | 5/2006 | Day et al. | |
| 7,042,440 B2 | 5/2006 | Pryor et al. | |
| 7,050,606 B2 | 5/2006 | Paul et al. | |
| 7,058,204 B2 | 6/2006 | Hildreth et al. | |
| 7,060,957 B2 | 6/2006 | Lange et al. | |
| 7,113,918 B1 | 9/2006 | Ahmad et al. | |
| 7,121,946 B2 | 10/2006 | Paul et al. | |
| 7,170,492 B2 | 1/2007 | Bell | |
| 7,184,048 B2 | 2/2007 | Hunter | |
| 7,202,898 B1 | 4/2007 | Braun et al. | |
| 7,222,078 B2 | 5/2007 | Abelow | |
| 7,227,526 B2 | 6/2007 | Hildreth et al. | |
| 7,259,747 B2 | 8/2007 | Bell | |
| 7,308,112 B2 | 12/2007 | Fujimura et al. | |
| 7,317,836 B2 | 1/2008 | Fujimura et al. | |
| 7,348,963 B2 | 3/2008 | Bell | |
| 7,359,121 B2 | 4/2008 | French et al. | |
| 7,367,887 B2 | 5/2008 | Watabe et al. | |
| 7,379,563 B2 | 5/2008 | Shamaie | |
| 7,379,566 B2 | 5/2008 | Hildreth | |
| 7,389,591 B2 | 6/2008 | Jaiswal et al. | |
| 7,412,077 B2 | 8/2008 | Li et al. | |
| 7,421,093 B2 | 9/2008 | Hildreth et al. | |
| 7,430,312 B2 | 9/2008 | Gu | |
| 7,436,496 B2 | 10/2008 | Kawahito | |
| 7,450,736 B2 | 11/2008 | Yang et al. | |
| 7,452,275 B2 | 11/2008 | Kuraishi | |
| 7,460,690 B2 | 12/2008 | Cohen et al. | |
| 7,489,812 B2 | 2/2009 | Fox et al. | |
| 7,536,032 B2 | 5/2009 | Bell | |
| 7,555,142 B2 | 6/2009 | Hildreth et al. | |
| 7,560,701 B2 | 7/2009 | Oggier et al. | |
| 7,570,805 B2 | 8/2009 | Gu | |
| 7,574,020 B2 | 8/2009 | Shamaie | |
| 7,576,727 B2 | 8/2009 | Bell | |
| 7,590,262 B2 | 9/2009 | Fujimura et al. | |
| 7,593,552 B2 | 9/2009 | Higaki et al. | |
| 7,598,942 B2 | 10/2009 | Underkoffler et al. | |
| 7,607,509 B2 | 10/2009 | Schmiz et al. | |
| 7,620,202 B2 | 11/2009 | Fujimura et al. | |
| 7,668,340 B2 | 2/2010 | Cohen et al. | |
| 7,680,298 B2 | 3/2010 | Roberts et al. | |
| 7,683,954 B2 | 3/2010 | Ichikawa et al. | |
| 7,684,592 B2 | 3/2010 | Paul et al. | |

(56) References Cited

U.S. PATENT DOCUMENTS

| | | | |
|---|---|---|---|
| 7,701,439 B2* | 4/2010 | Hillis et al. | 345/156 |
| 7,702,130 B2 | 4/2010 | Im et al. | |
| 7,704,135 B2 | 4/2010 | Harrison, Jr. | |
| 7,710,391 B2 | 5/2010 | Bell et al. | |
| 7,729,530 B2 | 6/2010 | Antonov et al. | |
| 7,746,345 B2 | 6/2010 | Hunter | |
| 7,760,182 B2 | 7/2010 | Ahmad et al. | |
| 7,809,167 B2 | 10/2010 | Bell | |
| 7,834,846 B1 | 11/2010 | Bell | |
| 7,852,262 B2 | 12/2010 | Namineni et al. | |
| RE42,256 E | 3/2011 | Edwards | |
| 7,898,522 B2 | 3/2011 | Hildreth et al. | |
| 7,971,157 B2* | 6/2011 | Markovic et al. | 715/863 |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2* | 12/2011 | Marks | 345/632 |
| 8,457,353 B2* | 6/2013 | Reville et al. | 382/103 |
| 8,830,168 B2* | 9/2014 | Underkoffler et al. | 345/158 |
| 2001/0035087 A1* | 11/2001 | Subotnick | 84/600 |
| 2003/0159567 A1* | 8/2003 | Subotnick | 84/626 |
| 2004/0118268 A1* | 6/2004 | Ludwig | 84/645 |
| 2004/0193413 A1* | 9/2004 | Wilson et al. | 704/243 |
| 2004/0239670 A1* | 12/2004 | Marks | 345/419 |
| 2006/0206581 A1 | 9/2006 | Howarth et al. | |
| 2007/0260517 A1* | 11/2007 | Zalewski et al. | 705/14 |
| 2008/0026838 A1 | 1/2008 | Dunstan et al. | |
| 2008/0048878 A1* | 2/2008 | Boillot | 340/686.1 |
| 2008/0098448 A1* | 4/2008 | Mondesir et al. | 725/126 |
| 2008/0111710 A1* | 5/2008 | Boillot | 341/22 |
| 2008/0212836 A1* | 9/2008 | Fujimura et al. | 382/103 |
| 2009/0018898 A1 | 1/2009 | Genen | |
| 2009/0027338 A1* | 1/2009 | Weinberg et al. | 345/158 |
| 2009/0122146 A1* | 5/2009 | Zalewski et al. | 348/169 |
| 2009/0183125 A1* | 7/2009 | Magal et al. | 715/863 |
| 2009/0210080 A1* | 8/2009 | Basson et al. | 700/94 |
| 2009/0215533 A1* | 8/2009 | Zalewski et al. | 463/32 |
| 2009/0231425 A1 | 9/2009 | Zalewski | |
| 2009/0268945 A1* | 10/2009 | Wilson et al. | 382/103 |
| 2009/0280897 A1 | 11/2009 | Fitzmaurice et al. | |
| 2009/0309846 A1* | 12/2009 | Trachtenberg et al. | 345/173 |
| 2010/0107099 A1* | 4/2010 | Frazier et al. | 715/765 |
| 2010/0146464 A1* | 6/2010 | Wilson et al. | 715/863 |
| 2010/0151946 A1* | 6/2010 | Wilson et al. | 463/36 |
| 2011/0102318 A1* | 5/2011 | Pathangay et al. | 345/158 |
| 2011/0111846 A1* | 5/2011 | Ciarrocchi | 463/30 |
| 2011/0128386 A1* | 6/2011 | Letessier et al. | 348/164 |
| 2012/0323364 A1* | 12/2012 | Birkenbach et al. | 700/257 |
| 2013/0190089 A1* | 7/2013 | Wilson et al. | 463/36 |

FOREIGN PATENT DOCUMENTS

| | | | |
|---|---|---|---|
| CN | 101254344 B | | 6/2010 |
| EP | 0583061 A2 | | 2/1994 |
| EP | 2524280 A1 | * | 11/2012 |
| JP | 08044490 A1 | | 2/1996 |
| WO | 93/10708 A1 | | 6/1993 |
| WO | 97/17598 A1 | | 5/1997 |
| WO | 99/44698 A1 | | 9/1999 |
| WO | WO0042733 A1 | | 7/2000 |

OTHER PUBLICATIONS

Pekelny, Yuri and Craig Gotsman. "Articulated Object Reconstruction and Markerless Motion Capture from Depth Video." Computer Graphics Forum, Apr. 2008, pp. 399-408, vol. 27, issue 2. Blackwell Publishing, Oxford, UK.

Ableton Suite 8, www.ableton.com.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/ Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "CONDENSATION—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collision of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

(56) References Cited

OTHER PUBLICATIONS

English Machine-translation of Japanese Publication No. JP08-044490 published on Feb. 16, 1996.
Office Action dated Jun. 5, 2014 in Chinese Patent Application No. 201110442987.9.
English language Abstract for CN1231753 published Oct. 13, 1999.
English language Abstract for CN1969589 published May 23, 2007.
"Second Office Action and Search Report issued in Chinese Patent Application No. 201110442987.9", and partial English translation, Mailed Date: Feb. 25, 2015, 18 Pages. (MS# 330703.02).
Response to Office Action filed Oct. 17, 2014 in Chinese Patent Application No. 201110442987.9.
English language Summary of, and English translation of claims as amended in, Response to Office Action filed Oct. 17, 2014 in Chinese Patent Application No. 201110442987.9.

* cited by examiner

INTERACTIVE CONTENT CREATION

BACKGROUND

For most people, music is mostly a consumption art form. The creation of music is really off limits except to the select few with the natural talent, creativity, education and tools associated with music creation. This makes music one of the least approachable art forms.

To make music creation more widespread and/or easier to accomplish, software has been developed to allow users to make music without playing instruments. Instead, a user will operate a user interface of a computer to generate the sounds of various instruments. However, some prior art music creation software is difficult to use. In some cases, even if a person knows how to use the software, it is difficult to create music that is enjoyable to listen to.

SUMMARY

An audio/visual system (e.g., such as an entertainment console) enables users to create music using movement, without requiring any knowledge of how to write music. The system plays a base track, such as a portion of a pre-recorded song or notes from one or more instruments. Using a depth camera or other sensor, the system automatically detects movement of a user or multiple users and creates new music by altering the music being played based on the detected movement. For example, detection of a location of the user can cause a particular base audio track to start playing and detection of the user (or a part of the user's body) moving into or within a collision volume can trigger the addition or subtraction of additional audio samples as well as various audio effects. The technology described herein can also be applied to other forms of content.

One embodiment includes playing audio content, automatically tracking movement of a user including automatically detecting predefined motion of the user, and automatically changing the audio content being played in response. In one example implementation, the audio content being played is automatically adjusted in response to the portion of the user entering a first collision volume. In other examples, the predefined motion of the user includes one or more gestures, motion of a center of mass (or other portion) of an object, movement of a limb, etc.

One embodiment includes an apparatus that creates audio content comprising a depth camera, a display interface, an audio interface and a processor in communication with the depth camera, display interface and audio interface. The processor plays a first base audio track. The processor is programmed to automatically detect first predefined movement of a user from a plurality of predefined movements based on data from the depth camera. Each predefined movement is associated with a different audio stem. The processor adds a first audio stem to the base track (and synchronized to the base track) in response to detecting that the user performed the first predefined movement. The first audio stem corresponds to the first predefined movement.

One embodiment includes one or more processor readable storage devices storing processor readable code thereon. The processor readable code is for programming one or more processors to perform a method that comprises defining one or more base tracks for a plurality of movement zones, identifying audio stems for a set of collision volumes for each zone and creating code based on the defined one or more base tracks for the plurality of movement zones and the indentified audio stems. The created code is capable of configuring a computing device to play the one or base tracks depending on which zone a user is positioned within. The created code is also capable of configuring the computing device to add or subtract audio stems based on the user intersecting or otherwise interacting with corresponding collision volumes.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DETAILED DESCRIPTION

An audio/visual system is described herein that enables users to create music (or other content) using movement. For example, the audio/visual system can play audio (or other type of) content and automatically track movement of a user (or multiple users) in the proximity of the audio/visual system while playing the audio (or other type of) content. Using one or more sensors (e.g., a depth camera and/or visual camera), the system can automatically detect that a portion of the user enters a collision volume, is performing a predefined movement within the collision volume, or is performing another predefined movement. The audio (or other type of) content being played is then automatically changed in response to detecting the user(s) entering the collision zone, performing a predefined movement within the collision volume and/or performing another predefined movement (of a set of a plurality of predefined movements). The changing of the content being played creates new content.

In one example implementation, the proximity of the audio/visual system is divided into zones. Each zone can be associated with a base audio track. The system will automatically detect which zone a user is positioned in, and play the associated base track in response thereto. Various audio stems and audio effects can be added and/or subtracted based on detection of the user entering or performing a predefined movement within the collision volume. In some embodiments, base video (or other visual content) associated with the zone is altered based on detection of the user entering and/or performing a predefined movement within the collision volume.

In other embodiments, rather than detecting the user entering a collision volume, the system can use predefined gestures (i.e. hold one or two arms over the head to initiate an audio track), or use something more abstract like tracking center of mass and making musical decisions based off of that, Gestures can also include distorting the sound, as well as creating specific notes. Other gestures could include triggering a loop (for example a gesture causes the last two bars to repeat) Another implementation allows the user to use movement more as an instrument. For example, the system might associate arm movement to the C scale of a piano sound so as the user swipes an arm from left to right they are generating a C scale in a piano sound. The user can move an arm in different movements to generate more complicated melodies. In another example, gestures or movement can be used to create percussion sounds, such as stamping a foot to create a bass drum rhythm, tapping in the air for hi-hat, and so forth. This type of instrument control could be used on it's own or layered on top of the audio stem solution described herein.

The systems can also include a musical visualizer, where visuals are simultaneously generated by both the movements of the user and/or analysis of the music itself.

Figure 1:
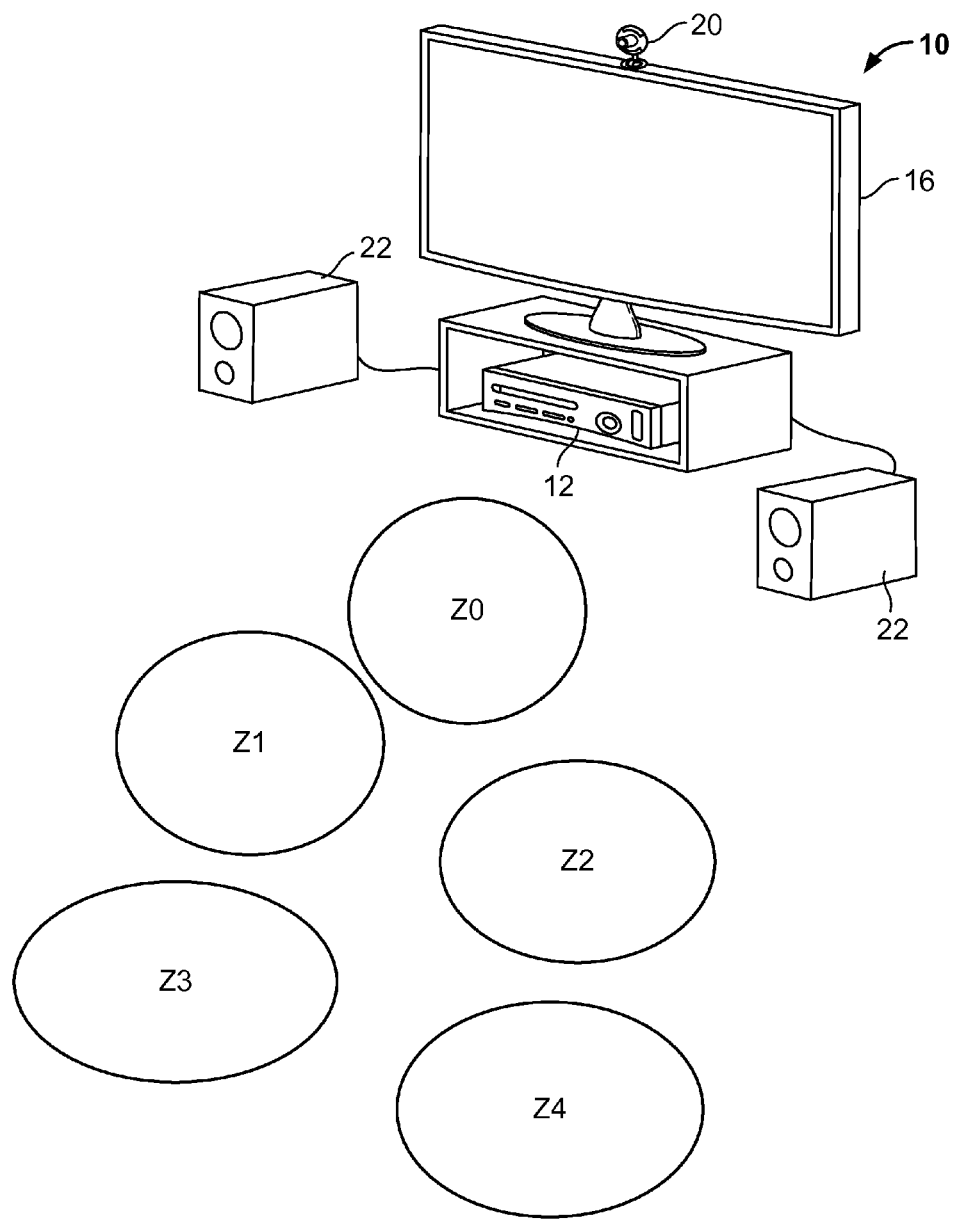
FIG. 1 illustrates an example embodiment of an Entertainment System.

The audio/visual system that provides the interactive, movement based music (or other content) generation experience can be a desktop computer, portable computer, Entertainment System, set top box, or other computing device. For example purposes, FIG. 1 depicts one embodiment of an Entertainment System 10 that can be used to generate music or other content based on the technology described herein. Entertainment system 10 includes computing system 12, which may be a computer, a gaming system or console, or the like. According to one example embodiment, computing system 12 may include hardware components and/or software components such that computing system 12 may be used to execute applications such as gaming applications, non-gaming applications, or the like. In one embodiment, computing system 12 may include a processor such as a standardized processor, a specialized processor, a microprocessor, or the like that may execute instructions stored on a processor readable storage device for performing the processes described herein. Entertainment system 10 also include a capture device 20, which may be, for example, a camera that can visually monitor one or more users such that gestures and/or movements performed by the one or more users may be captured, analyzed, and tracked to perform one or more controls or actions within an application and/or animate an avatar or other on-screen character. Additionally, as described below, capture device 20 may be used with computing system 12 to automatically determine if a user is in one of zones Z0, Z1, Z2, Z3 or Z4 in order to customize interaction with the user.

According to one embodiment, computing system 12 may be connected to an audio/visual output device 16 such as a television, a monitor, a high-definition television (HDTV), or the like that may provide television, movie, video, game or application visuals and/or audio to a user. For example, computing system 12 may include a video adapter such as a graphics card and/or an audio adapter such as a sound card that may provide audio/visual signals associated with the game application, non-game application, or the like. Audio/visual output device 16 may receive the audio/visual signals from computing system 12 and may then output the television, movie, video, game or application visuals and/or audio to the user. According to one embodiment, audio/visual device output device 16 may be connected to the computing system 12 via, for example, an S-Video cable, a coaxial cable, an HDMI cable, a DVI cable, a VGA cable, component video cable, or the like. For purposes of this document, the term audio/visual means audio only, visual only or audio in combination with visual.

Figure 2:
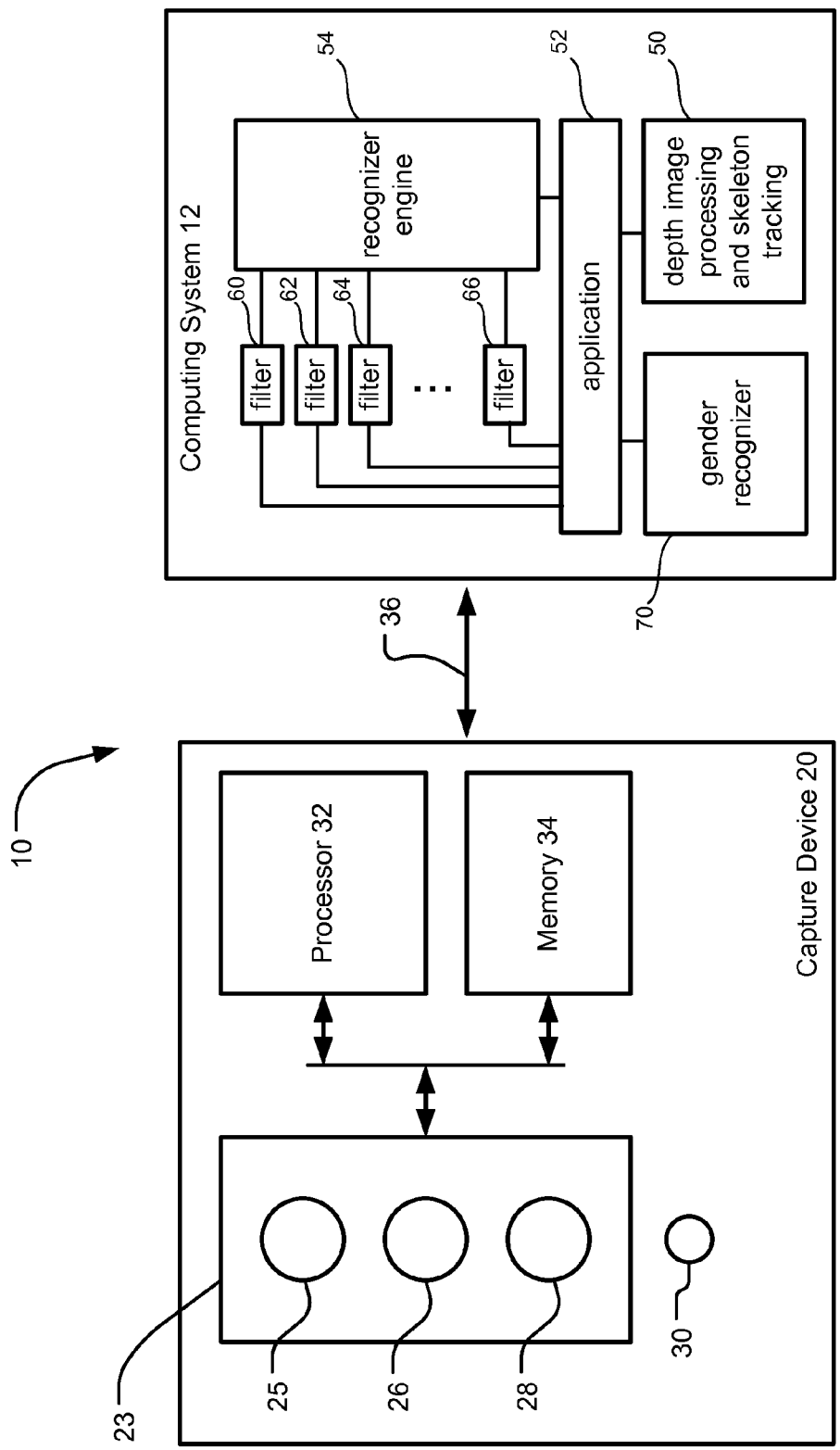
FIG. 2 is a block diagram depicting portions of an Entertainment System.

FIG. 2 illustrates an example embodiment of the capture device 20 and computing system 12. According to the example embodiment, the capture device 20 may be configured to capture video with depth information including a depth image that may include depth values via any suitable technique including, for example, time-of-flight, structured light, stereo image, or the like. According to one embodiment, the capture device 20 may organize the depth information into "Z layers," or layers that may be perpendicular to a Z axis extending from the depth camera along its line of sight.

As shown in FIG. 2, the capture device 20 may include a camera component 23. According to an example embodiment, the camera component 23 may be a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the camera.

As shown in FIG. 2, according to an example embodiment, the image camera component 23 may include an infra-red (IR) light component 25, a three-dimensional (3-D) camera 26, and an RGB (visual image) camera 28 that may be used to capture the depth image of a scene. For example, in time-of-flight analysis, the IR light component 25 of the capture device 20 may emit an infrared light onto the scene and may then use sensors (not shown) to detect the backscattered light from the surface of one or more targets and objects in the scene using, for example, the 3-D camera 26 and/or the RGB camera 28. In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as grid pattern, a stripe pattern, or different pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 (and/or other sensor) and may then be analyzed to determine a physical distance from the capture device to a particular location on the targets or objects. In some implementations, the IR Light component 25 is displaced from the cameras 25 and 26 so triangulation can be used to determined distance from cameras 25 and 26. In some implementations, the capture device 20 will include a dedicated IR sensor to sense the IR light, or a sensor with an IR filter.

According to another embodiment, the capture device 20 may include two or more physically separated cameras that may view a scene from different angles to obtain visual stereo data that may be resolved to generate depth information. Other types of depth image sensors can also be used to create a depth image.

The capture device 20 may further include a microphone 30. The microphone 30 may include a transducer or sensor that may receive and convert sound into an electrical signal. According to one embodiment, the microphone 30 may be used to reduce feedback between the capture device 20 and the computing system 12 in the target recognition, analysis, and tracking system 10. Additionally, the microphone 30 may be used to receive audio signals that may also be provided to computing system 12.

In an example embodiment, the capture device 20 may further include a processor 32 that may be in communication with the image camera component 22. The processor 32 may include a standardized processor, a specialized processor, a microprocessor, or the like that may execute instructions including, for example, instructions for receiving a depth image, generating the appropriate data format (e.g., frame) and transmitting the data to computing system 12.

The capture device 20 may further include a memory component 34 that may store the instructions that are executed by processor 32, images or frames of images captured by the 3-D camera and/or RGB camera, or any other suitable information, images, or the like. According to an example embodiment, the memory component 34 may include random access memory (RAM), read only memory (ROM), cache, flash memory, a hard disk, or any other suitable storage component. As shown in FIG. 2, in one embodiment, memory component 34 may be a separate component in communication with the image capture component 22 and the processor 32. According to another embodiment, the memory component 34 may be integrated into processor 32 and/or the image capture component 22.

As shown in FIG. 2, capture device 20 may be in communication with the computing system 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing system 12 may provide a clock to the capture device 20 that may be used to determine when to capture, for example, a scene via the communication link 36. Additionally, the capture device 20 provides the depth information and visual (e.g., RGB) images captured by, for example, the 3-D camera 26 and/or the RGB camera 28 to the computing system 12 via the communication link 36. In one embodiment, the depth images and visual images are transmitted at 30 frames per second. The computing system 12 may then use the model, depth information, and captured images to, for example, control an application such as a content generation system.

Computing system 12 includes depth image processing and skeletal tracking module 50, which uses the depth images to track one or more persons detectable by the depth camera. Depth image processing and skeletal tracking module 50 is software that provides the tracking information to application 52, which can be a video game, productivity application, communications application or other software application etc. The audio data and visual image data is also provided to application 52 and depth image processing and skeletal tracking module 50. Application 52 provides the tracking information, audio data and visual image data to recognizer engine 54. In another embodiment, recognizer engine 54 receives the tracking information directly from depth image processing and skeletal tracking module 50 and receives the audio data and visual image data directly from capture device 20.

Recognizer engine 54 is associated with a collection of filters 60, 62, 64, . . . , 66 each comprising information concerning a gesture, action or condition that may be performed by any person or object detectable by capture device 20. For example, the data from capture device 20 may be processed by filters 60, 62, 64, . . . , 66 to identify when a user or group of users has performed one or more gestures or other actions. Those gestures may be associated with various controls, objects or conditions of application 52. Thus, the computing environment 12 may use the recognizer engine 54, with the filters, to interpret movements.

Capture device 20 of FIG. 2 provides RGB images (or visual images in other formats or color spaces) and depth images to computing system 12. The depth image may be a plurality of observed pixels where each observed pixel has an observed depth value. For example, the depth image may include a two-dimensional (2-D) pixel area of the captured scene where each pixel in the 2-D pixel area may have a depth value such as distance of an object in the captured scene from the capture device.

Figure 3:
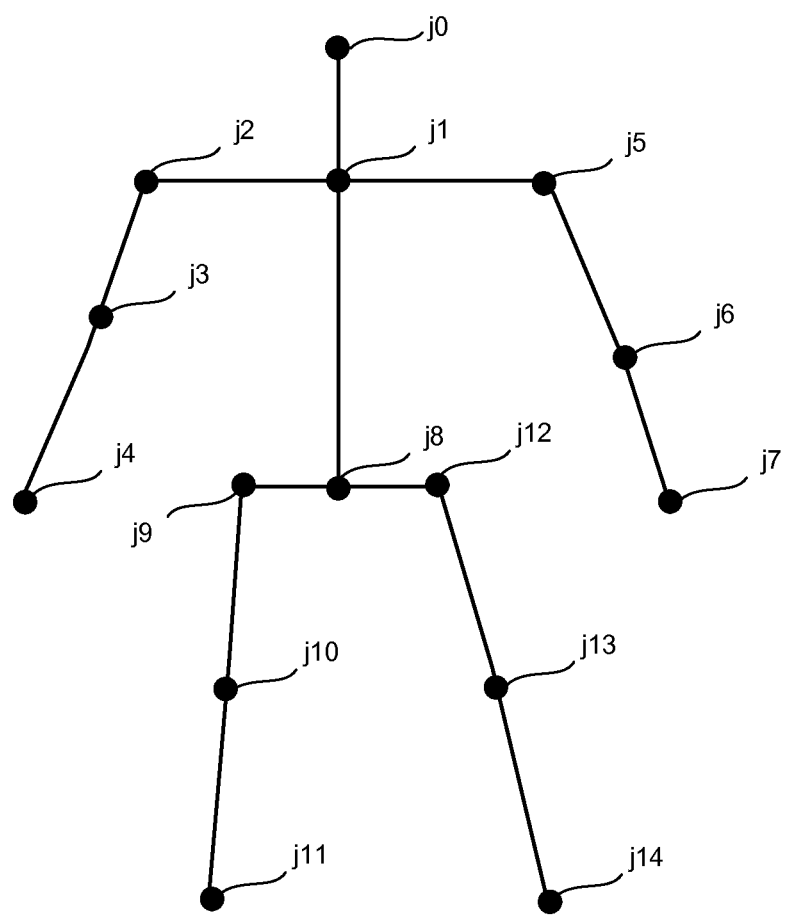
FIG. 3 depicts an example of a skeleton being tracked.

The system will use the RGB images and depth images to track a user's movements. For example, the system will track a skeleton of a person using the depth images. There are many methods that can be used to track the skeleton of a person using depth images. One suitable example of tracking a skeleton using depth image is provided in U.S. patent application Ser. No. 12/603,437, "Pose Tracking Pipeline" filed on Oct. 21, 2009, Craig, et al. (hereinafter referred to as the '437 Application), incorporated herein by reference in its entirety. The process of the '437 Application includes acquiring a depth image, down sampling the data, removing and/or smoothing high variance noisy data, identifying and removing the background, and assigning each of the foreground pixels to different parts of the body. Based on those steps, the system will fit a model to the data and create a skeleton. The skeleton will include a set of joints and connections between the joints. FIG. 3 shows an example skeleton with 15 joints (j0, j1, j2, j3, j4, j5, j6, j7, j8, j9, j10, j11, j12, j13, and j14). Each of the joints represents a place in the skeleton where the skeleton can pivot in the x, y, z directions or a place of interest on the body. Other methods for tracking can also be used. Suitable tracking technology is also disclosed in the following four U.S. patent applications, all of which are incorporated herein by reference in their entirety: U.S. patent application Ser. No. 12/475,308, "Device for Identifying and Tracking Multiple Humans Over Time," filed on May 29, 2009; U.S. patent application Ser. No. 12/696,282, "Visual Based Identity Tracking," filed on Jan. 29, 2010; U.S. patent application Ser. No. 12/641,788, "Motion Detection Using Depth Images," filed on Dec. 18, 2009; and U.S. patent application Ser. No. 12/575,388, "Human Tracking System," filed on Oct. 7, 2009.

Recognizer engine 54 (of computing system 12 depicted in FIG. 2) includes multiple filters 60, 62, 64, . . . , 66 to determine a gesture or action. A filter comprises information defining a gesture, action or condition along with parameters, or metadata, for that gesture, action or condition. For instance, moving an arm up and down may be implemented as a gesture comprising information representing the movement of one of the arms of the user in the vertical direction, as that movement would be captured by the depth camera. Parameters may then be set for that gesture. Where the gesture is a an up/down movement of an arm, a parameter may be a threshold velocity that the arm has to reach, a distance the arm must travel (either absolute, or relative to the size of the user as a whole), and a confidence rating by the recognizer engine that the gesture occurred. These parameters for the gesture may vary between applications, between contexts of a single application, or within one context of one application over time.

Filters may be modular or interchangeable. In one embodiment, a filter has a number of inputs (each of those inputs having a type) and a number of outputs (each of those outputs having a type). A first filter may be replaced with a second filter that has the same number and types of inputs and outputs as the first filter without altering any other aspect of the recognizer engine architecture. For instance, there may be a first filter for driving that takes as input skeletal data and outputs a confidence that the gesture associated with the filter is occurring and an angle of steering. Where one wishes to substitute this first driving filter with a second driving filter—perhaps because the second driving filter is more efficient and requires fewer processing resources—one may do so by simply replacing the first filter with the second filter so long as the second filter has those same inputs and outputs—one input of skeletal data type, and two outputs of confidence type and angle type.

A filter need not have a parameter. For instance, a "user height" filter that returns the user's height may not allow for any parameters that may be tuned. An alternate "user height" filter may have tunable parameters—such as to whether to account for a user's footwear, hairstyle, headwear and posture in determining the user's height.

Inputs to a filter may comprise things such as joint data about a user's joint position, angles formed by the bones that meet at the joint, RGB color data from the scene, and the rate of change of an aspect of the user. Outputs from a filter may comprise things such as the confidence that a given gesture is being made, the speed at which a gesture motion is made, and a time at which a gesture motion is made.

Recognizer engine 54 may have a base recognizer engine that provides functionality to the filters. In one embodiment, the functionality that the recognizer engine 54 implements includes an input-over-time archive that tracks recognized gestures and other input, a Hidden Markov Model implementation (where the modeled system is assumed to be a Markov process—one where a present state encapsulates any past state information necessary to determine a future state, so no other past state information must be maintained for this purpose—with unknown parameters, and hidden parameters are determined from the observable data), as well as other functionality required to solve particular instances of gesture recognition.

Filters 60, 62, 64, . . . , 66 are loaded and implemented on top of the recognizer engine 54 and can utilize services provided by recognizer engine 54 to all filters 60, 62, 64, . . . , 66. In one embodiment, recognizer engine 54 receives data to determine whether it meets the requirements of any filter 60, 62, 64, . . . , 66. Since these provided services, such as parsing the input, are provided once by recognizer engine 54 rather than by each filter 60, 62, 64, . . . , 66, such a service need only be processed once in a period of time as opposed to once per filter for that period, so the processing required to determine gestures is reduced.

Application 52 may use the filters 60, 62, 64, . . . , 66 provided with the recognizer engine 54, or it may provide its own filter, which plugs in to recognizer engine 54. In one embodiment, all filters have a common interface to enable this plug-in characteristic. Further, all filters may utilize parameters, so a single gesture tool below may be used to debug and tune the entire filter system.

More information about recognizer engine 54 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474, 655, "Gesture Tool" filed on May 29, 2009. both of which are incorporated herein by reference in their entirety.

Figure 4:
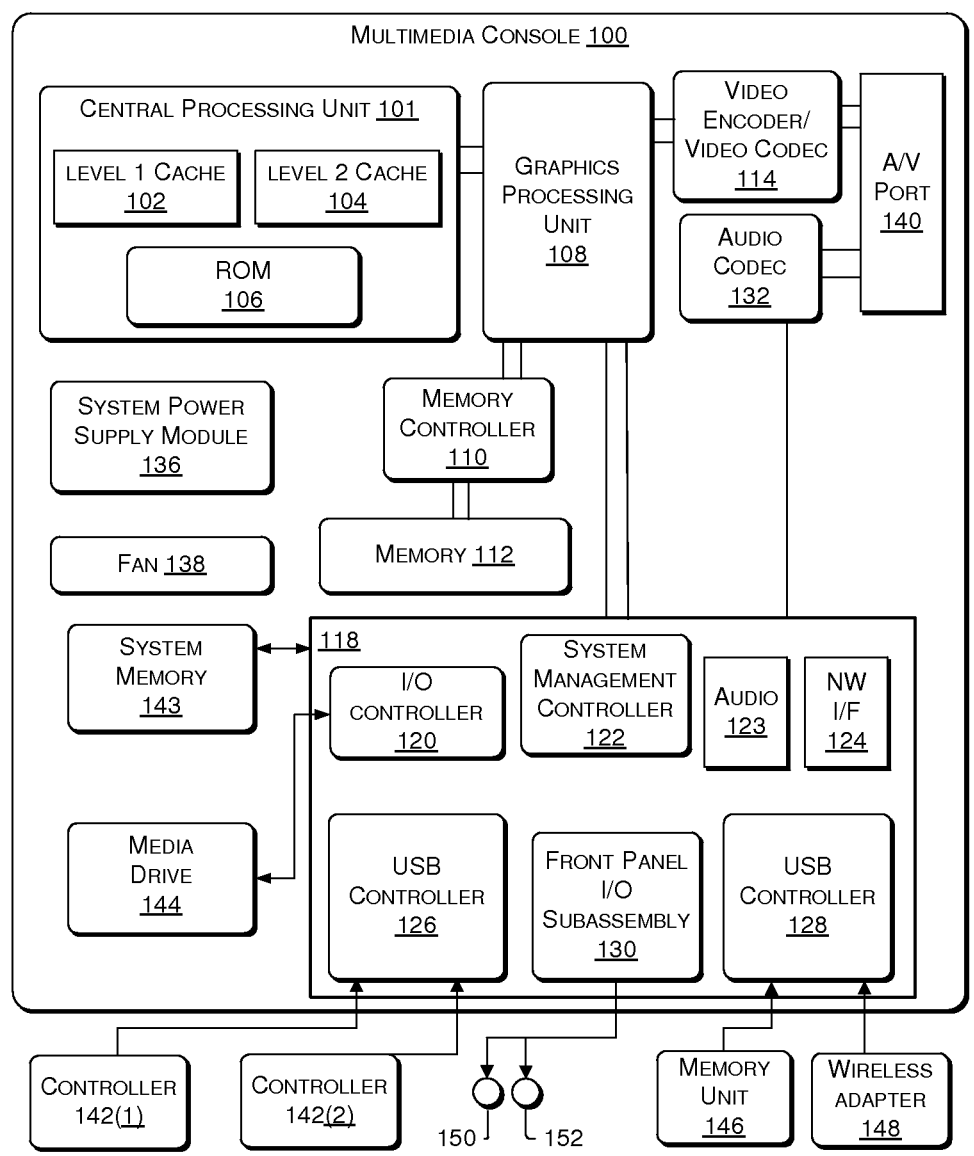
FIG. 4 illustrates an example embodiment of a computing system.

FIG. 4 illustrates an example embodiment of a computing system that may be used to implement computing system 12 shown in FIGS. 1 and 2 used to track motion and/or animate (or otherwise update) an avatar or other on-screen object displayed by an application. The computing system such as the computing system 12 described above with respect to FIGS. 1-2 may be a multimedia console 100, such as a gaming console. As shown in FIG. 4, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered on.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, Blu-Ray drive, hard disk drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio user or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered on, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., pop ups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without the gaming application's knowledge and a driver maintains state information regarding focus switches. The cameras 26, 28 and capture device 20 may define additional input devices for the console 100 via USB controller 126 or other interface.

Figure 5:
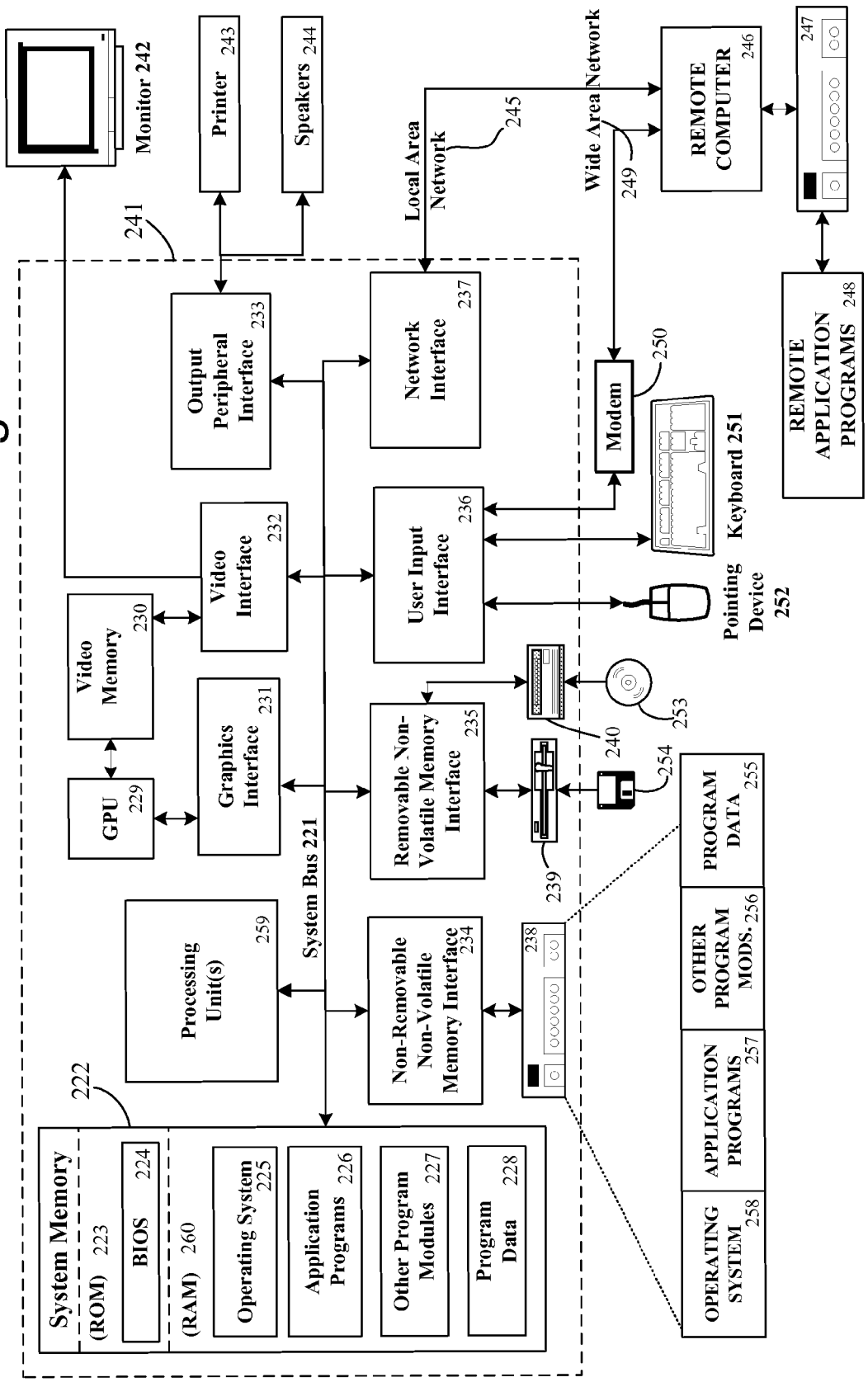
FIG. 5 illustrates another example embodiment of a computing system.

FIG. 5 illustrates another example embodiment of a computing system 220 that may be used to implement the computing system 12 shown in FIGS. 1-2 used to track motion and/or animate (or otherwise update) an avatar or other on-screen object displayed by an application. The computing system environment 220 is only one example of a suitable computing system and is not intended to suggest any limitation as to the scope of use or functionality of the presently disclosed subject matter. Neither should the computing system 220 be interpreted as having any dependency or requirement relating to any one or combination of components illustrated in the exemplary operating system 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computing system 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 4 illustrates operating system 225, application programs 226, other program modules 227, and program data 228.

The computer 241 may also include other removable/non-removable, volatile/nonvolatile computer storage media. By way of example only, FIG. 5 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235. GPU 229 is connected to system bus 221 by graphics interface 231. Video Memory 230 (which is connected to GPU 229) is connected to system bus 221 by video interface 232.

The drives and their associated computer storage media discussed above and illustrated in FIG. 5 provide storage of computer readable instructions, data structures, program modules and other data for the computer 241. In FIG. 5, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 20 may define additional input devices for the console 100 that connect via user input interface 236. A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233. Capture Device 20 may connect to computing system 220 via output peripheral interface 233, network interface 237, or other interface.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 5. The logical connections depicted include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 5 illustrates application programs 248 as residing on memory device 247. It will be appreciated that the network connections shown are exemplary and other means of establishing a communications link between the computers may be used.

Either of the systems of FIG. 4 or 5, or a different computing system, can be used to implement Entertainment System 12 of FIG. 2.

Figure 6:
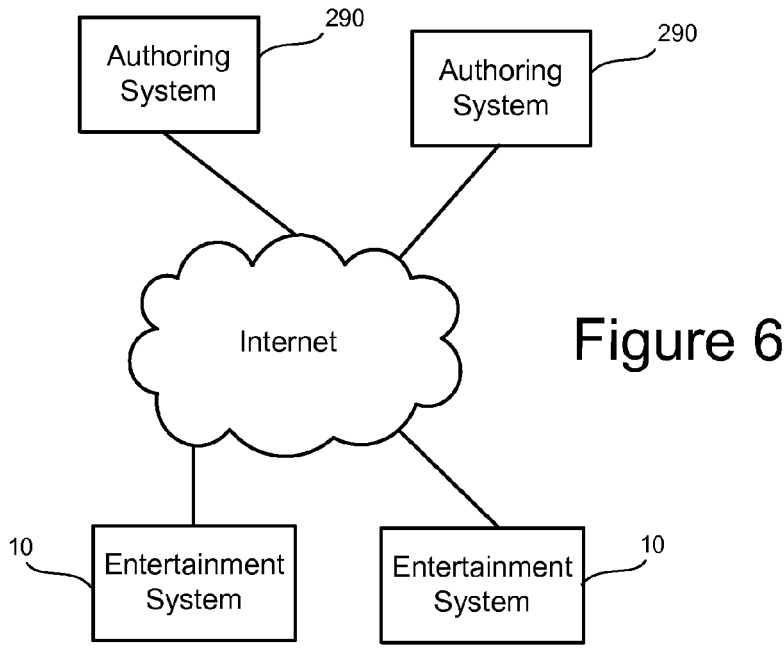
FIG. 6 is a block diagram of various components used to implement the technology described herein.

FIG. 6 is a block diagram depicting the various components used to implement the technology described herein. Other computing systems can also be used. FIG. 6 shows two Entertainment Systems 10; however, more or less than two Entertainment Systems can be used. Entertainment Systems 10 can communicate with one or more Authoring Systems 290 via the internet or other network. As will be explained below, Entertainment Systems 10 provide an interactive content generation experience for one or more users. Authoring Systems 290 allows one or more artists, producers or other entities to create an interactive content generation experience.

Figure 7:
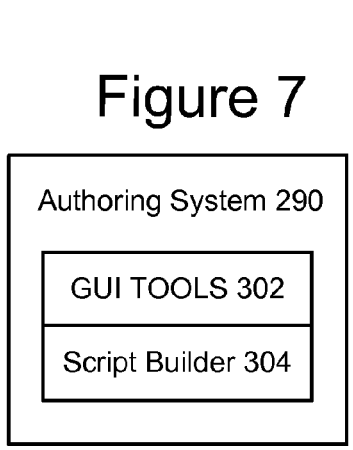
FIG. 7 is a block diagram of software components on an authoring system.

FIG. 7 is a block diagram depicting one embodiment of software installed on authoring system 290 that can be used to create an interactive content generation experience. FIG. 7 shows authoring system 290 including GUI Tools 302 and Script Builder 304. GUI Tools 302 is used to create a graphical user interface ("GUI") and allows the artist or content provider to create/configure an interactive content generation experience. The GUI Tools 302 will provide a set of options for identifying various units of content, movements and locations for creating the interactive content generation experience. Once the author defines the experience, Script Builder 304 will be used to create code that will configure or otherwise program Entertainment System 10 to provide the interactive content generation experience authored using GUI Tools 302.

Figure 8:
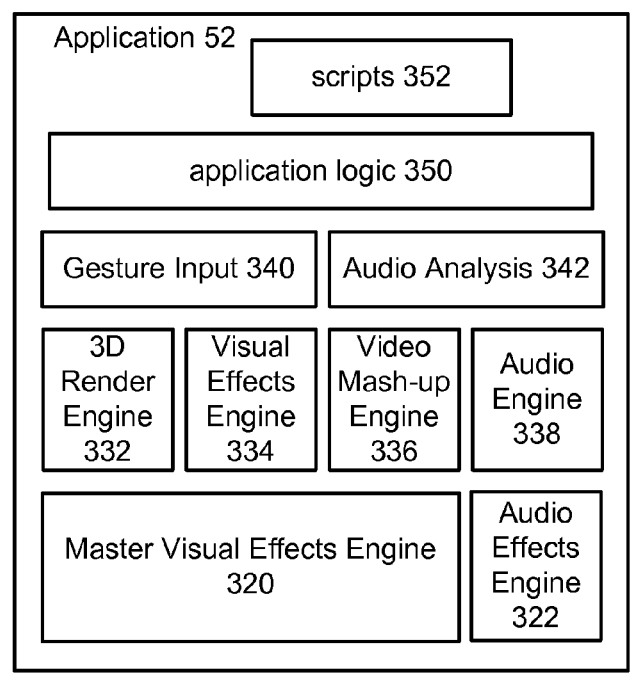
FIG. 8 is a block diagram of software components on an Entertainment System.

FIG. 8 is a block diagram depicting software modules that reside in Entertainment System 10, as part of Application 52 (see FIG. 2). The software depicted in FIG. 8 is tiered into four layers (plus one or more scripts 352). The bottom layer includes Master Visual Effects Engine 320 and Audio Effects Engine 322. Master Visual Effects Engine 320 is used to create the visual effects that are depicted visually by Entertainment System 10. Audio Effects Engine 322 will create audio effects, as discussed below. Above Master Visual Effects Engine 320 are 3 D Render Engine 332, Visual Effects Engine 334, and Video Mash-up Engine 336. 3D Render Engine 332 is used to render three dimensional images. Visual Effects Engine 334 creates visual effects for displaying by Entertainment System 10. Video Mash-up Engine 336 can be used to mash videos if the person interacting with Entertainment System 10 is generating video content. Audio Engine 334 is used to play, edit and/or otherwise alter various audio content.

Gesture Input module 340 receives an indication of the gesture or movement of a user and provides that information to the other software components. Audio analysis 342 can be used to identify features of the audio being played in order to perform effects, synchronize audio, etc. Application 52 also includes application logic 350, which is the main logic for controlling the operation of the interactive content generation experience. Scripts 352 includes one or more scripts received from script builder 304 of one or more authoring systems 290. The scripts include code (e.g., software instructions) for configuring and/or programming the particular content generation experience. Scripts can be downloaded to Application 52 via a network, loaded via media (e.g. CD-ROM, DVD, flash memory drive, etc.), or programmed by the user (if the user has access to an authoring system 290 separate from or combined with Application 52).

Figure 9:
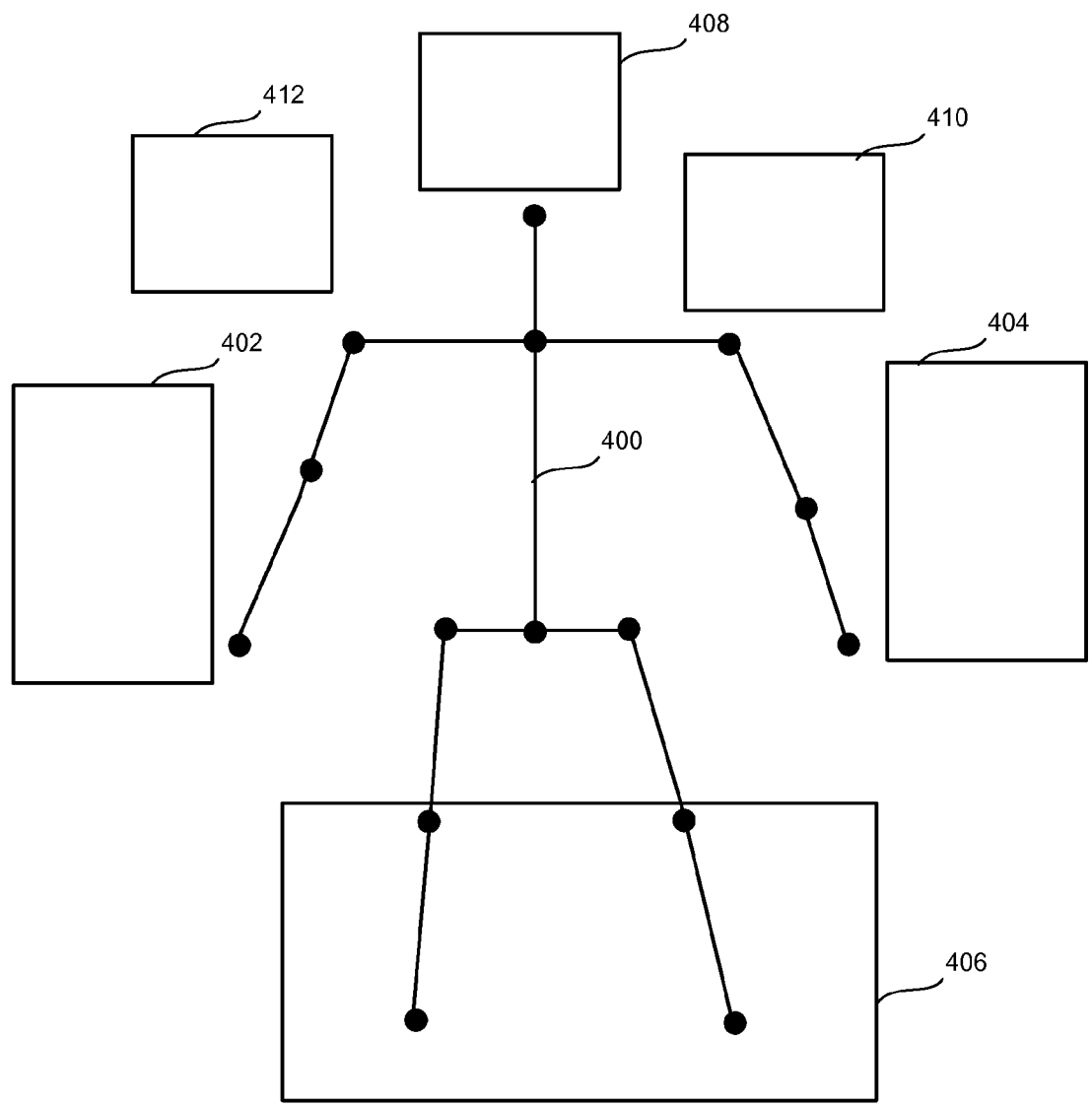
FIG. 9 graphically depicts example collision volumes.

After an author of an interactive content generation experience creates a script and that script is loaded into the Entertainment System 10, the script will be used to configure Entertainment System 10 (using the software depicted in FIG. 8) to play content (e.g. audio content), automatically track movement of a user including automatically detecting that a user (or a portion of a user) has entered or is otherwise interacting in or with a collision volume, and automatically change the content being played in response to detecting that the user (or a portion of the user) has entered or is interacting in or with the collision volume. The collision volume is a three dimensional structure (e.g., cube, cuboid, or other three dimensional structure) that is virtually created by Entertainment System 10 next to or near each of the users being tracked. The collision volumes cannot be seen in the room where the user is standing. In some embodiments, however, Entertainment System 10 can display a visual representation of the collision volumes on a display device (e.g. audio/visual output device 16 of FIG. 1). For example, FIG. 9 shows a stick figure representing user 400 of Entertainment System 10. Surrounding user 400 are collision volume 402, 404, 406, 408, 410, and 412. Collision volume 402 is next to the right arm of user 400. Collision volume 404 is located next to the left arm of user 400. In other embodiments, additional collision volumes can be located in front of or behind the arms. Alternatively, one or more collision volumes can surround one or more of the arms. Collision volume 406 is located in front of both legs of user 400. In other embodiments, additional collision volumes can be located behind both legs, or one or more collision volumes can surround one or more of the legs. Collision volume 408 is located above the head of user 408. In other embodiments, additional collision volumes can be located in front of, behind, or to the side of the user's head. Collision volume 410 is over the left shoulder of user 400. Collision volume 412 is over the right shoulder of user 400. Additional collision volumes can be positioned in front of or behind the torso of user 400. Collision volumes can also be placed in other locations. When a user is detected to have entered a collision volume (the appropriate part of the user's body enters the relevant collision volume), various pieces of content can be toggled on, toggled off, started, interrupted, etc. In some embodiments, the system can track the movement of the user in a collision volume such that the system can identify predefined movement by a user within a collision volume. This predefined movement can be used to trigger, toggle or control one or more effects, as discussed below.

Figure 10:
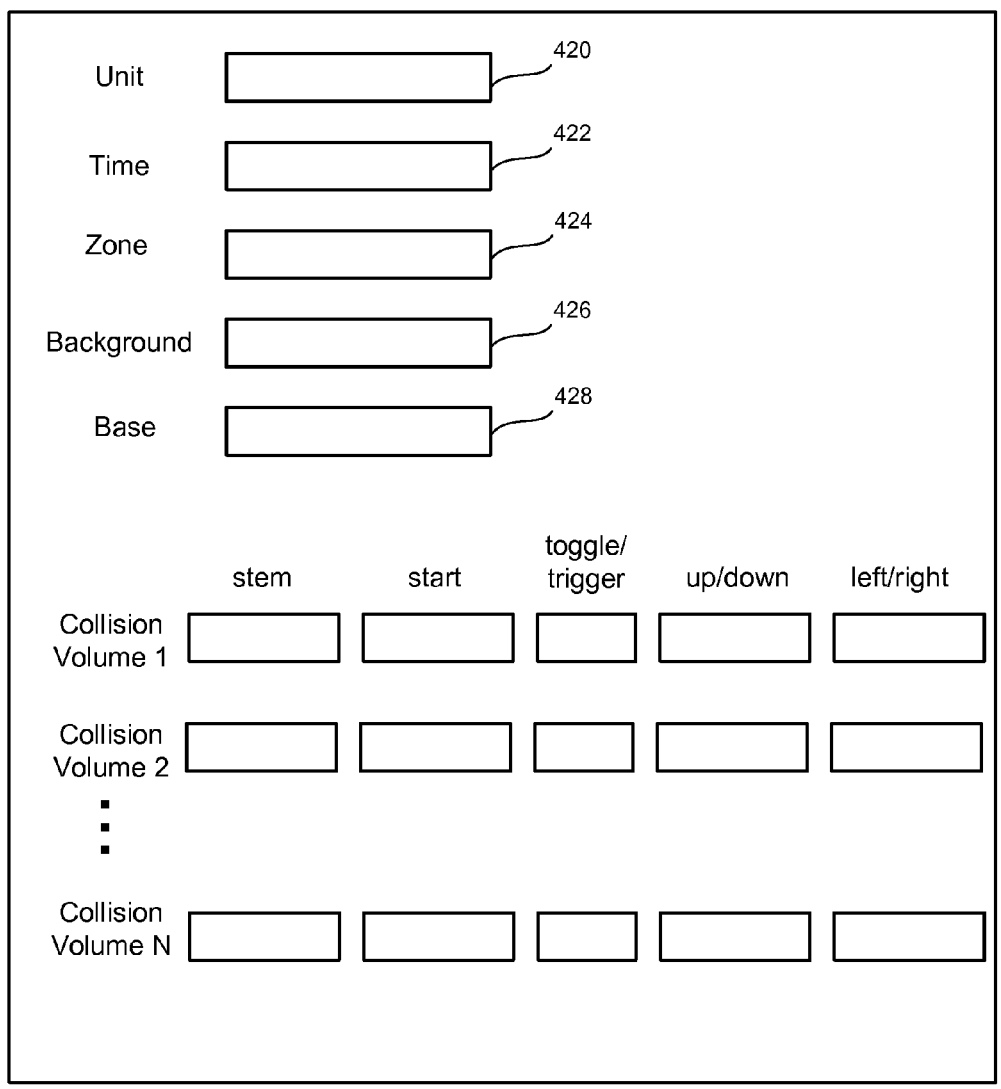
FIG. 10 depicts a user interface for an authoring system.

FIG. 10 provides one example of a graphical user interface implemented by GUI Tools 302 of Authoring System 290 so that a person can create an interactive content generation experience. For example purposes, the discussion of FIG. 10 will assume that the content being generated is musical content. However, other content can also be generated.

The graphical user interface of FIG. 10 includes multiple interface items for inputting data. The top input item depicted is for indicating a unit. In an interactive experience, the experience can be divided up into units of time or segments of interaction. For example, a song can be broke up into ten (or other number) of units. The number of units in an experience is completely configurable by the author. Thus, an author can input into user interface element 420 which unit the author is configuring at the specific time. User interface item 422 is used to indicate how long the unit should be experienced.

In user interface item 424, the author will indicate which zone is currently being configured by the author. Looking back at FIG. 1, the room in which Entertainment System 10 is located will be broken up into a set of zones. FIG. 1 shows five zones (Z0, Z1, Z2, Z3 and Z4). In other embodiments, the system can include more or less than five zones. In FIG. 1, the zones are ovals; however, other shapes can also be used. These zones may not be marked in the actual room. However, in one embodiment. Entertainment System 10 may display a graphical representation of these zones on audio/visual output device 16 (see FIG. 1). The system can track whether a user is in one of the zones. In one embodiment, if the user is not in a zone, the user is not participating in the content generation process. If the user is in one of the zones, the user can participate in the content generation process. In one example implementation, the content generation process will be different depending on which zone the user is in. Therefore, the author will configure separate programming for each zone by indicating which zone is currently being configured in user interface item 424 of FIG. 10.

User interface item 426 is utilized to configure a background image and/or a background visual program to use with the current unit (or the entire experience). A base track for the particular zone is indicated with user interface item 428. The base track is content that is played when the system automatically determines that the user is in the corresponding zone. If the system has five zones, there can be five separate base tracks, one for each zone. In other embodiments, more than one zone can share a base track. In the case of audio, a base track can be a portion of a song (including a subset of instruments playing that song), the vocal track for a song, predefined sound or a set of notes from an instrument (or multiple instruments) or one or more sounds from a synthesizer. If the base track s shorter than the time (see 422) for the unit, then the base track will be repeated. Note that user interface items 420-428 can be drop down menus, text boxes, etc.

After configuring unit, time, zone, background and base track, the author will identify the actions associated with each of the collision volumes. The GUI of FIG. 10 shows N collision volumes. The technology described herein can be used with any suitable number of collision volumes. For each collision volume, the author can define (or otherwise add) an indication of a stem, a start condition, an indication of whether the user's interaction with the collision volume should toggle on/off the stem being played as a loop or trigger then stem for playing once, an action to be taken with up/down motion within the collision volume and an action to be taken with left/right motion within the collision volume. For each of the data items input for a collision volume, the GUI can provide a drop down menu, text box, or other user interface item.

An example of a stem for music content can include a portion of a song (including a subset of instruments playing that song), a vocal track for a song, a predefined sound or set of one or more notes from an instrument (or a set of instruments) and/or one or more sounds from a synthesizer.

A start condition can include having the stem start playing when the base track starts playing. In this start condition, when it is detected that a user has entered the corresponding collision volume, the stem can be turned off. Another start condition can include the stem being dormant (not being played) when the user is tracked to enter the zone and the base audio track is played. In this condition, when it is determines that the user has entered a collision volume, the stem can start playing at that point.

The up/down motion and left/right motion are two examples of pre-defined motion within a collision volume. For example, if a user is tracked to put the user's arm within a collision volume and move up or down within a collision volume, that moving up or down can be used to cause an effect to be performed and/or control that effect. Similarly, if the user is tracked to move the user's arm left or right within an collision volume, that motion can be used to cause an effect to be performed and/or control that effect. These predefined motions can be used with any limb of the user or any body part of the user, in any of the collision volumes, as configured using the GUI of FIG. 10.

One example of an action that can be taken when the user performs a predefined motion within a collision volume (e.g. up/down, left/right, . . . ) include changing the volume of a stem. For example, if the user moves the user's hand up in a collision volume the volume can be increased and if the user moves a hand down the volume can be decreased. Similarly, if the user moves the hand to the left, the volume can be increased and if the user moves the hand to the right the volume can be decreased. Other effects that can be performed include turning an echo on or off, changing the number of echoes heard (e.g. move the hand up causes more echoes, move hand down lowers the number of echoes), controlling the pass band of a frequency filter for musical content, changing the beat, changing the tempo, adding/changing reverb effect, changing pitch, etc.).

Figure 11:
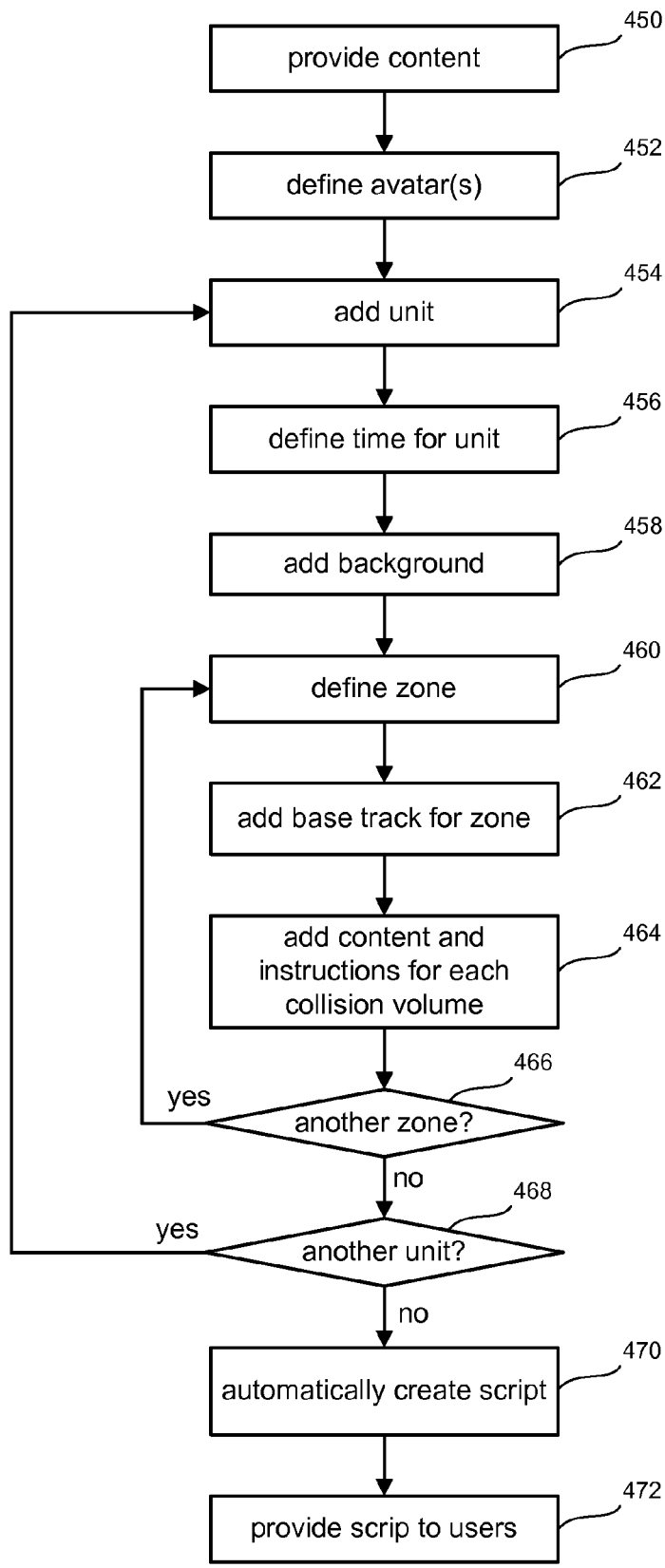
FIG. 11 is a flow chart describing one embodiment of a process for authoring an interactive content generation experience.

FIG. 11 is a flowchart describing one embodiment of a process for authoring an interactive content generation experience using the GUI of FIG. 10. In step 450, the author can provide content, including the various files for the base tracks stems and audio effects. In step 452, the author can define or provide one or more avatars that will be presented on Entertainment System 10. In one embodiment, the avatar will perform the same movements as the user. Since the system is tracking the user, the system can configure the avatar to copy the movements of the user. In step 454, the author will add a new unit for the interaction by configuring user interface item 420. In step 456, the author will define the time duration for the unit using user interface item 422. In step 458, the author can add a background image or visual system to the experience for this unit by using user interface item 426.

In one embodiment, the background image can be a still image. In another embodiment, the background image can be video. In another embodiment, the background can be a visible system. For example, a visual system can be tied to music being played using a frequency analyzer. Brightness can be tied to the music, a radio blur effect can be provided with focus tied to the beat, posterizing can be performed of the user or the user's avatar that changes to the music, etc. A broad range frequency analyzer can be used to determine how much energy is in each of a plurality of frequency bands. Each frequency band can be tied to a particular visual effect. In one embodiment, a particle system can be implemented. The particle system can be configured to obey the law of physics (or a different set of rules) and be configured to be attracted to or repelled by a portion of the user's body or other locations or objects in the room. If the particle system is configured to be attracted or repelled by the user's hand, for example, as the user's hand moves, the particles will move differently thereby changing the visual presentation on audio/visual output device 16 of Entertainment System 10.

Looking back at step 460, the author will define the zone being configured. As discussed with respect to FIG. 1, the room may include many zones. The author will indicate which zone is currently being configured. In step 462, the author will indicate which base track will be used for that zone using user interface item 428. In step 464, the author will add content instructions for each of the collision volumes for the zone being configured. For example, the author will identify the stem, the start condition, whether the stem should be toggled or triggered, a function to be performed in response to up/down motion and function to be performed in response to left/right motion, for each collision volume of the zone. If there is another zone to configure (step 466), the process will loop back to step 460 to define the next zone. When, in step 466, it is determined that all zones have been configured for the unit under consideration, then it is determined whether any more units that need to be configured (step 468). If there are more units to configure, the process will loop back to step 454 to configure the next unit. If all units have been configured, then script builder 304 will automatically create the script (e.g. software code) for the interactive content generation experience in step 470. The form or format of the script generated in step 470 can be any form known in the art suitable for the particular implementation. There is no particular form or structure of a script that needs to be utilized herein.

The looping of steps 460-466 and steps 454-468 allow multiple units to be configured and multiple zones for each unit to be configured such that the content generation experience will have multiple units. This way, the author will be defining one or more base tracks for a plurality of zones (also referred to as moving zones), identifying audio stems for a set of collision volumes for each zone, and creating code based on a defined one or more base tracks for the plurality of zones and the identified audio stems for the set of collision volumes for each zone. That code is capable of configuring a computing device (e.g. Entertainment System 10) to play the one or more base tracks, depending on the zone in which the user is positioned. The code is also capable of configuring the computing device (e.g. Entertainment System 10) to add or subtract audio stems based on the user interacting with the corresponding collision volumes.

Figure 12:
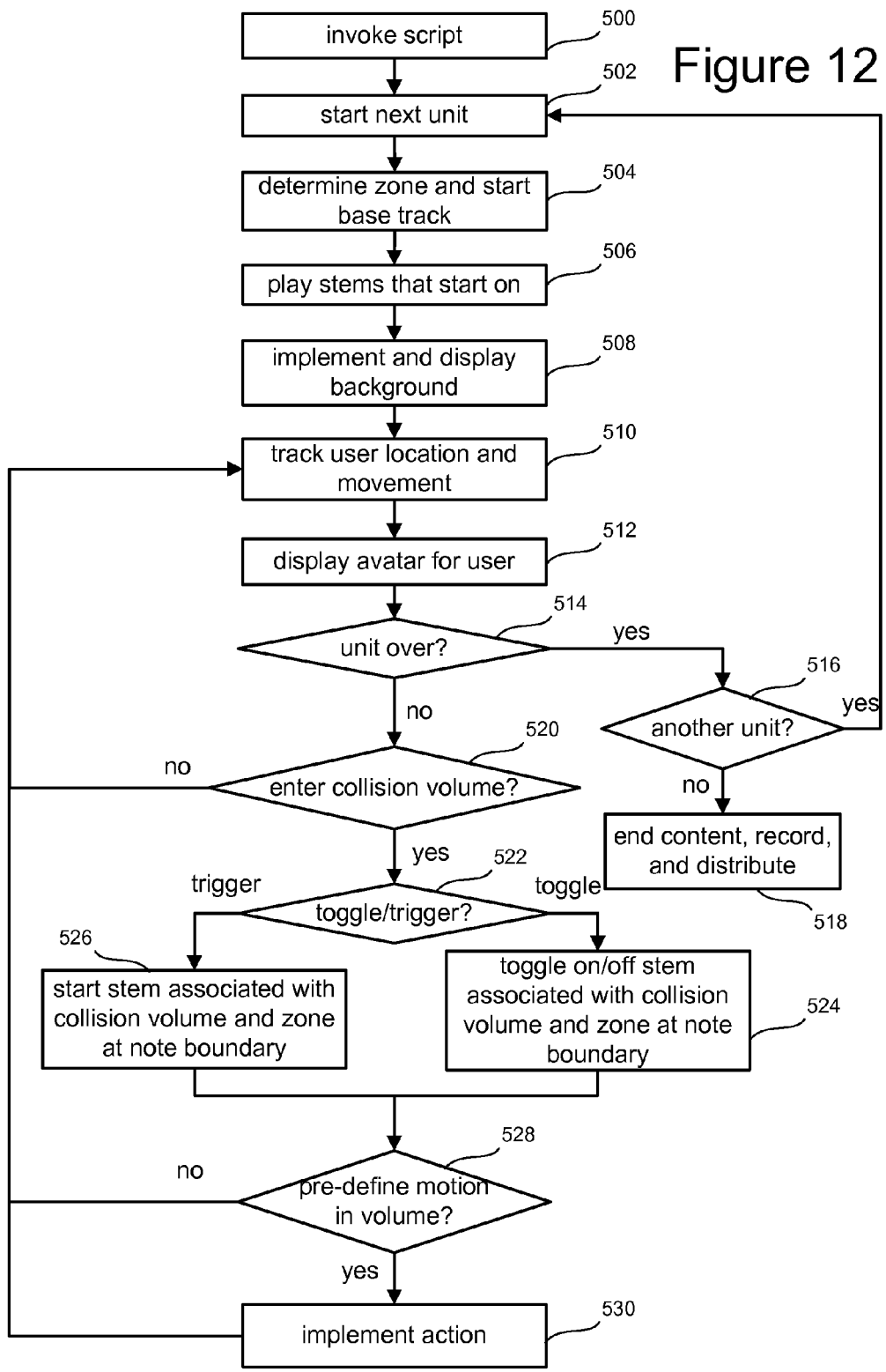
FIG. 12 is a flow chart describing one embodiment of a process for performing an interactive content generation experience.

FIG. 12 is a flowchart describing one embodiment of a process for using the script generated from the process of FIG. 11 in order to perform content generation. In step 500, a user will invoke the script. For example, the script may be part of a CD-ROM or DVD which includes the entire software for the interactive experience. Placing the disk into the Entertainment System 10 will cause the software (including the script) to run. In other embodiments, the script can be transmitted to the Entertainment System 10 via a network, portable storage medium, etc. The user may have multiple scripts to choose from and will choose the appropriate script so that script will start running in step 500. In step 502, the next unit is implemented. As discussed above, the interactive experience may have multiple units (multiple segments). When the script is started, the first unit is loaded. As discussed above, that unit will include instructions for each of the zones and each of the collision volumes. In step 504, the system automatically determines the zone the user is positioned in and starts playing the appropriate base track for that zone. As discussed above, the system will use capture device 20 to automatically track the user's movements and location and determine which zone the user is in. In step 506, the system will start playing those stems that have a start condition that indicates the stems initial condition is to start playing. In step 508, the visual background (configured in step 458) will be implemented. Step 508 can include implementing a background process (e.g. a particle system) that will be operated throughout the performance of the process of FIG. 12 such that the displayed visual content will be changed in response to detecting that the portion of the user entered the first collision volume. In step 510, the system will continue to track the user's location and movement. In one embodiment, the system will track the user's location and movement throughout the process of FIG. 12. In step 512, the avatar for the user will be displayed. In one embodiment, the avatar will mimic the movements of the user based on the system tracking the movement's of the user. In step 514, it is determined whether the time period for the unit is over. If the time allotted for the unit is over, then in step 516 it is determined whether there is another unit to perform. If there are no more units to perform, then the interactive experience has completed (step 518). If there is another unit to perform, then the process loops back to step 502 and starts the next unit.

If, in step 514, it is determined that the unit is not over, then the system determines whether the user has entered one of the collision volumes in step 520. If not, the system will continue to track user location and movement (step 510).

If it is determined that a user (or a portion of the user such as the user's arms, legs, etc.) have entered one or more of the collision volumes, then it is determined whether the stem has been configured to be toggled on/off or triggered for one time playing in response to a user entering the collision volume. If the stem has been configured to toggle on/off, then in step 524 the stem will be toggled on if the stem is not currently playing. The stem will be toggled off if the stem is currently being played. In one embodiment, the stem is toggled on or off at a note boundary (e.g. ¼ note boundary, ⅛ note boundary, etc.) in order to keep the stem coordinated with the beat of the base audio track. If the stem has been configured to be triggered, then in step 526, the stem is started on a note boundary (e.g. ¼ note boundary, ⅛ note boundary, etc.) in order to keep the stem coordinated with the beat of the base audio track. Both steps 524 and 526 are examples of automatically changing the content being played (e.g. base track and any stems currently being played) based on the stem associated with the collision volume interacted with in the current zone the user is standing in. The of automatically changing the content being played results in new content being generated.

After step 524 or step 526, the process continues at step 528, during which the system will detect whether the user performed any of the predefined motions within the collision volume. If the user is not performing any of the predefined motions, then the process loops back to step 510 and continues to track the user. If the user is performing one of the predefined motions, then the action associated with the predefined motion will be performed in step 530. For example, if the user is performing an up or down motion, the appropriate function will be performed, as configured using the GUI of FIG. 10. Similarly, if the user is performing a left or right motion, the appropriate function will be performed. Other predefined actions can also be utilized. In one alternative, the test of 528 and function carried out in step 530 can be performed at any time during the process of FIG. 12. After performing the action of step 530, the process loops back to step 510.

In the above example, the discussion contemplated one user using movements to change audio being played in order to create new audio. In other embodiments, multiple users can concurrently use movements in order to generate the new audio (or other content). In one example, one user will be designated the main user. The base track for the zone the main user is standing in will be the base track played. Each of the other users standing in other zones will have stems added or subtracted to based on those other users entering collision volumes. Various effects can be performed based on each of the users performing the predefined motions in their collision volumes. In one example, all users would turn on or off the same stems based on interaction with analogous collision volumes. In other embodiments, each zone will be associated with a different set of stems so that each user will turn on or off different stems in response to interaction with collision volumes. In one embodiment, the designation of main use will change in response to a predefined motion, gesture or command.

In another embodiment, each base track for each zone for each user can be played simultaneously. In another embodiment, only the main user need be in a zone, and other users can affect the audio being generated by interacting with collision volumes for each user without the user being in the zone.

In some implementations, the system can track the location movement of multiple users in a room and display an avatar for each user being tracked. Each avatar will move in coordination with the corresponding user being tracked. Thus, the system will automatically track movement and location of multiple users, and the automatically changing of the audio content being played includes automatically changing the audio content being played in response to and based on the tracked movement of multiple users such that different movements of different users changes the audio content being played in different ways. For example, step 510 of FIG. 12 will include tracking the location movement of multiple users. Step 512 will include displaying multiple avatars for multiple users. Steps 520, 522, 524, 526, 528 and 530 can be performed concurrently for multiple users.

When the interactive content generation process is complete (step 518), the system can record the content created. For example, the audio will be recorded and saved as an audio file in any format known in the art. Additionally, the associated video (e.g. the visual backgrounds implemented in step 508) can be saved in any format suitable for storing video. This saved content can then be distributed. For example, the can be provided on a social networking site or posted to a site (or channel) for similar content generation. For example, a service can be created that aggregates content generated using the process of FIG. 12 from multiple sources and allows users to view content that has been generated by others.

In another alternative, the Internet (or other network) can be used so that multiple entertainment consoles 10 can work together to generate a single set of content. That is, the process of FIG. 12 can be performed for multiple users; however, the multiple users can be at different locations using different Entertainment Systems 10 that communicate with each other via a network (e.g. the Internet and/or local area networks). Each of the Entertainment Systems will include its own capture device 20 for determining which zone the corresponding user is in and whether the user is interacting with a collision volume. One of the Entertainment Systems 10 can be identified as the master and will receive all the data in order to create the new content, display that new content to the local user and transmit that new content to the remote Entertainment System for presentation to the remote user.

Note that the order of steps depicted in FIG. 12 is not necessarily required. The various steps can be performed in other orders. Many of the steps of FIG. 12 can be performed concurrently. Additionally, many of the steps can be performed continuously throughout the operation of the process of FIG. 12.

In another embodiment, the system allows one or more users to dance (or perform other movement) in front of capture device 20 to given music. While the one or more users are dancing, the systems captures and analyzes the movement (similar to the skeleton tracking described above). In response to tracking and understanding the users' movements, the system will build a control scheme that would best fit to drive the given music again. The system can use the same methodology to analyze video clips, etc. For instance, the system could train data based on a music video, thus requiring user to move like the dancing in the music video to create the appropriate output.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

We claim:

1. A method for audio content creation, comprising:
defining a plurality of three-dimensional collision volumes, the plurality of three-dimensional collision zones being at least partially different three-dimensional spaces;
assigning a base track of music to each of the plurality of three-dimensional collision volumes;
playing audio content;
automatically tracking movement of a user, including automatically detecting predefined motion of the user in one or more of the plurality of collision volumes; and
automatically changing the audio content upon entry of a body part into one or more of the collision volumes, the change in the audio content being based on which collision volume or volumes are entered by a body part and what predefined motions are performed within the one or more collision volumes.

2. The method of claim 1, wherein:
the predefined motion of the user includes a portion of the user entering a first collision volume of the one or more collision volumes;
the automatically changing the audio content includes automatically changing the audio content being played in response to detecting that the portion of the user entered the first collision volume;
the playing audio content includes playing a base audio track; and
the automatically changing the audio content being played includes adding a first audio stem to the base track and synchronized with the base track in response to detecting that the portion of the user entered the first collision volume, the first audio stem is associated with the first collision volume.

3. The method of claim 2, further comprising:
automatically detecting that a portion of the user entered a second collision volume of the one or more collision volumes, the second collision volume being different than the first collision volume, the first collision volume and the second collision volume are part of a plurality of collision volumes, each collision volume of the plurality is associated with a different audio stem, a second audio stem is associated with the second collision volume; and
automatically changing the audio content being played by adding the second audio stem to the base track in response to detecting that the portion of the user entered the second collision volume.

4. The method of claim 3, further comprising:
automatically detecting that a portion of the user entered the second collision volume after changing the audio content being played by adding the second audio stem to the base track; and
automatically changing the audio content being played by removing the second audio stem from the base track in response to detecting that the portion of the user entered the second collision volume after changing the audio content being played by adding the second audio stem to the base track.

5. The method of claim 2, further comprising:
detecting predefined movement within the first collision volume; and
performing an effect on the audio content being played in response to detecting the predefined movement.

6. The method of claim 2, further comprising:
automatically detecting a location of the user, the base audio track is chosen from multiple audio tracks based on the detected location of the user.

7. The method of claim 2, wherein:
the base audio track is a portion of a song; and
the first audio stem is sound from a subset of instruments playing the song.

8. The method of claim 2, wherein:
the base audio track is pre-recorded sound from a first instrument; and
the first audio is pre-recorded sound from a second instrument.

9. The method of claim 2, wherein:
the base audio track is first sound from a synthesizer; and
the first audio is second sound from the synthesizer.

10. The method of claim 2, further comprising:
automatically detecting which zone the user is located in of a plurality of zones, each zone corresponds to a different base audio track, the playing the base audio track is performed in response to the automatically detecting which zone the user is located in.

11. The method of claim 1, further comprising:
displaying visual content and changing the visual content in response to detecting the predefined motion of the user, the visual content are simultaneously generated by both the movements of the user and analysis of the music itself.

12. The method of claim 1, wherein:
the automatically tracking movement of the user is performed using a depth camera.

13. The method of claim 1, wherein:
the automatically tracking movement of the user includes automatically tracking movement of multiple users; and the automatically changing the audio content being played includes automatically changing the audio content being played in response to and based on the tracked movement of multiple users such that different movement changes the audio content being played in different ways.

14. One or more processor readable storage devices storing processor readable code thereon, the processor readable code for programming one or more processors to perform a method comprising:

defining one or more base tracks for a plurality of movement zones;

identifying audio stems for a set of collision volumes for each zone; and creating code based on the defined one or more base tracks for the plurality of movement zones and the identified audio stems for the set of collision volumes for each zone, the code capable of configuring a computing device to automatically play the one or base tracks depending on which zone a user is positioned, the code capable of configuring the computing device to add or subtract audio stems based on the user intersecting corresponding collision volumes.

15. One or more processor readable storage devices according to claim 14, wherein:

the method further comprises associating one or more audio effects with one or more predefined movements within one or more of the collision volumes; and the code is capable of configuring the computing device to perform the one or more audio effects in response to one or more predefined movements within one or more of the collision volumes.

16. One or more processor readable storage devices according to claim 14, wherein:

the method further comprises defining a custom avatar; and the creating code includes providing a description of the avatar in the code.

* * * * *